United States Patent
Bousky

[11] 3,873,180
[45] Mar. 25, 1975

[54] LIGHT BEAM SCANNING SYSTEM WITH SCAN ANGLE DEMAGNIFICATION

[75] Inventor: Samuel Bousky, Redwood City, Calif.

[73] Assignee: Ampex Corporation, Redwood City, Calif.

[22] Filed: Sept. 10, 1973

[21] Appl. No.: 395,780

[52] U.S. Cl. .................... 350/7, 350/285, 350/294
[51] Int. Cl. ............................................. G02b 17/00
[58] Field of Search ........... 350/6, 7, 288, 293, 294, 350/299, 285, 199, 200; 178/7.6

[56] References Cited
UNITED STATES PATENTS

| | | | |
|---|---|---|---|
| 3,244,885 | 4/1966 | McHenry | 350/7 |
| 3,469,030 | 9/1969 | Priebe | 350/7 |
| 3,508,068 | 4/1970 | Harris et al. | 350/6 |
| 3,520,586 | 7/1970 | Bousky | 350/6 |
| 3,750,189 | 7/1973 | Fleischer | 350/7 |
| 3,782,803 | 1/1974 | Buck | 350/7 |
| 3,790,246 | 2/1974 | Pickering | 350/7 |

*Primary Examiner*—Alfred E. Smith
*Assistant Examiner*—Michael J. Tokar

[57] ABSTRACT

Specific arrangements of optical elements are utilized in various demagnifier embodiments to provide scan angle demagnification of a scanning beam in a light scan system which utilizes a rotating mirror polygon, and further beam redirecting optics, to produce the scan. Scan angle demagnification may be achieved by locating the rotating mirror polygon within the beam redirecting optical means relative to a spot forming lens to provide a ratio of conjugates, and thus a final scan angle of proportionately smaller angle than the initial scan angle. That is, the initial scan beam reflected from the rotating mirror polygon to the elements of the beam redirecting optics form an angle $\theta$ with respect to the optical axis of the system. Upon traverse of the beam redirecting optical elements, the resulting scan beam crosses the optical axis again at a point beyond the beam redirecting optics at a smaller angle $\phi$, thus providing a final scan beam with scan angle demagnification. The invention may employ negative and positive reflector and/or refractor lens elements in association with, or as part of, the beam redirecting optics, to provide the scan angle demagnification effect. In the invention combination, selected refractor lens elements inherently provide a nonlinear distortion, which is utilized to advantage to make the spot position on the focal plane substantially a linear function of the tangent of the field angle. The distortion correction may further be utilized to advantage to produce a flat focal field, and thus a flat scan line at the recording medium.

13 Claims, 11 Drawing Figures

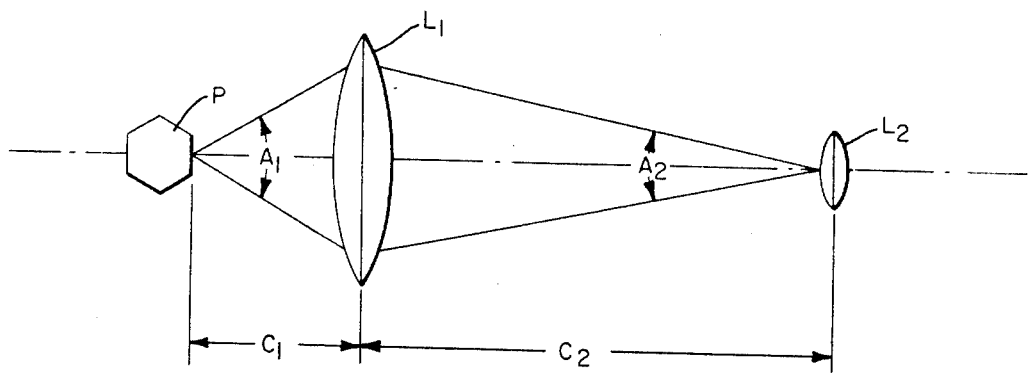
FIG_1
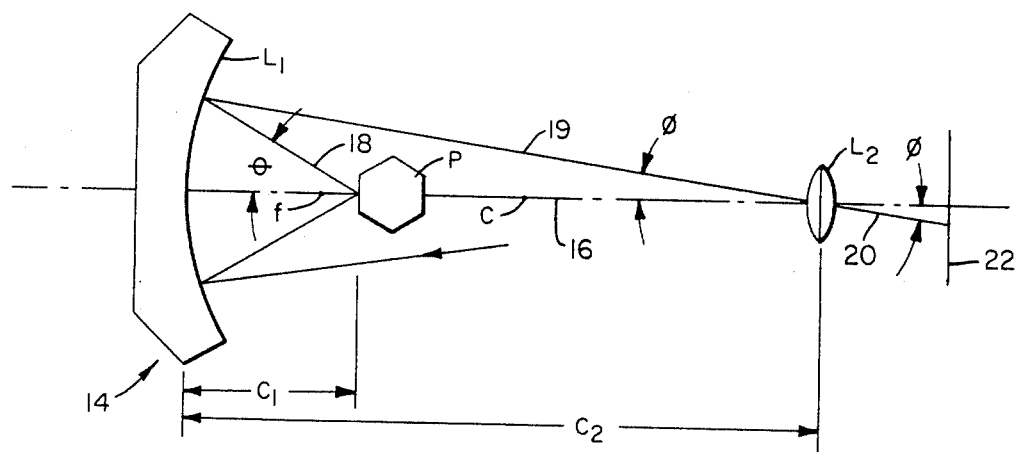
FIG_2
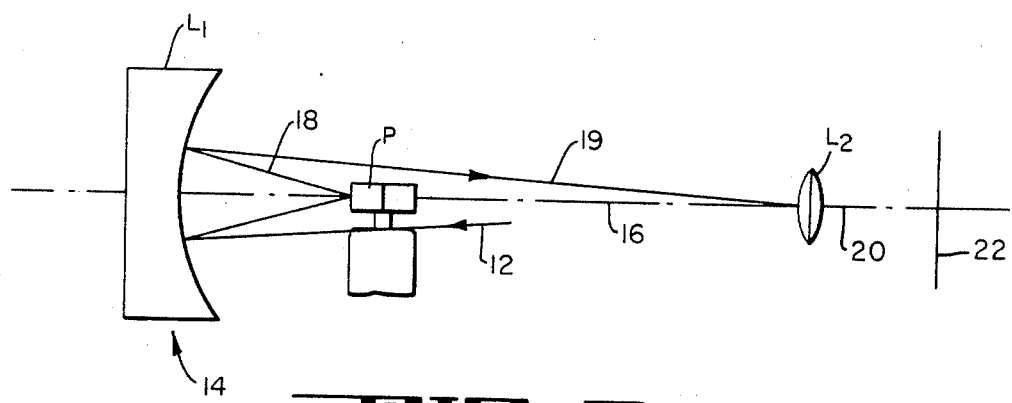
FIG_3

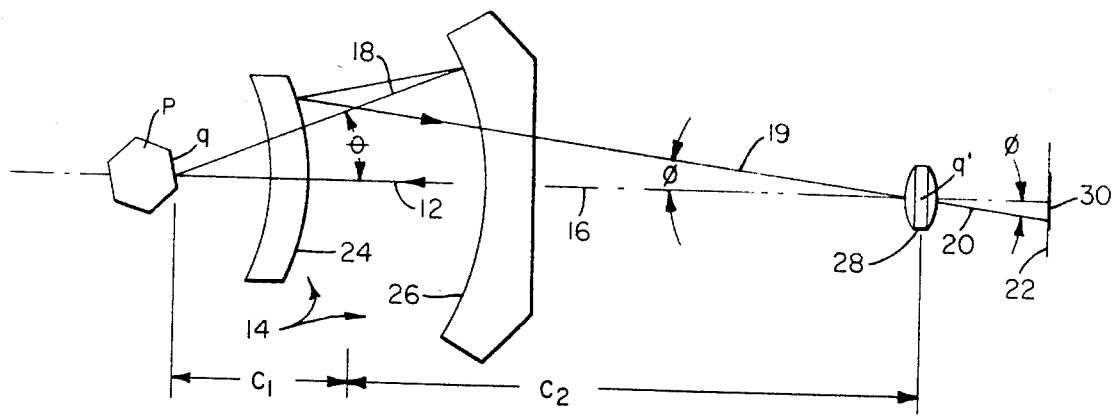
FIG_4
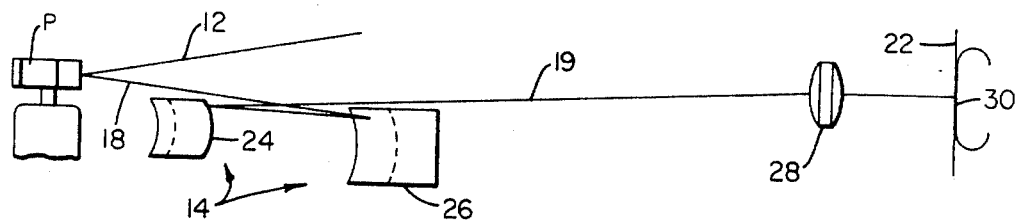
FIG_5
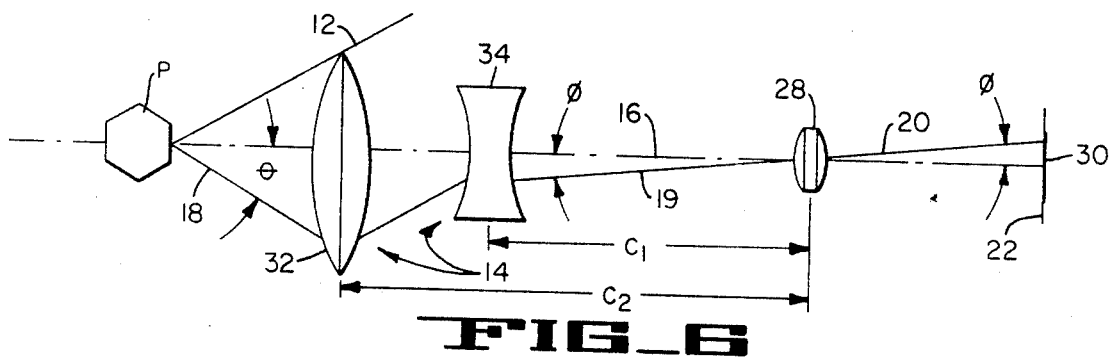
FIG_6
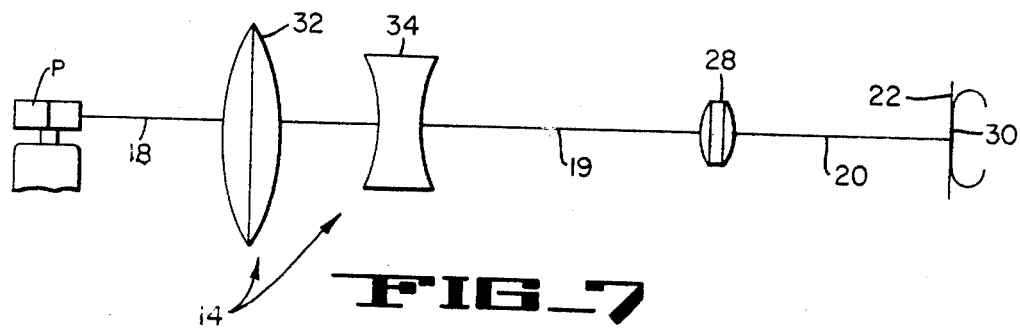
FIG_7

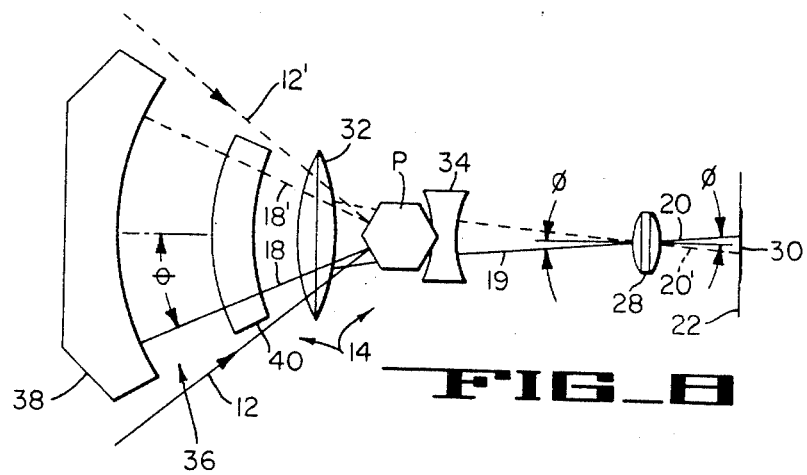
FIG_8
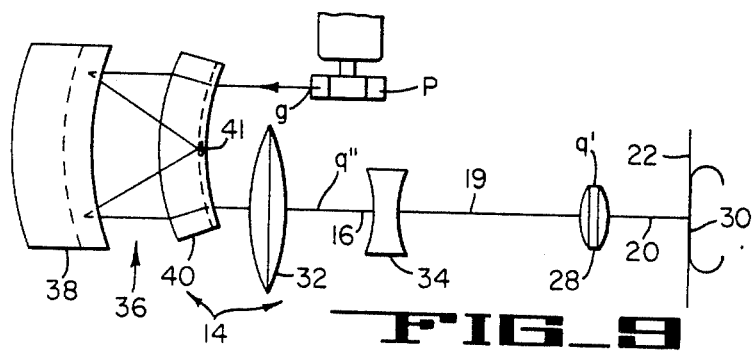
FIG_9
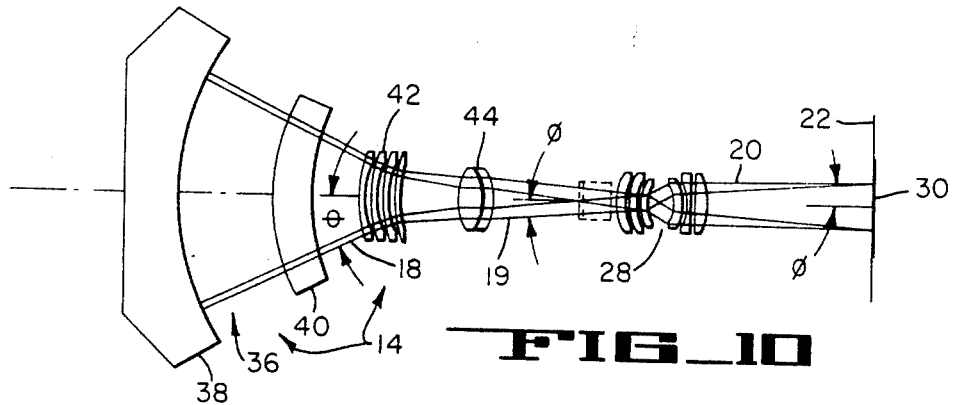
FIG_10
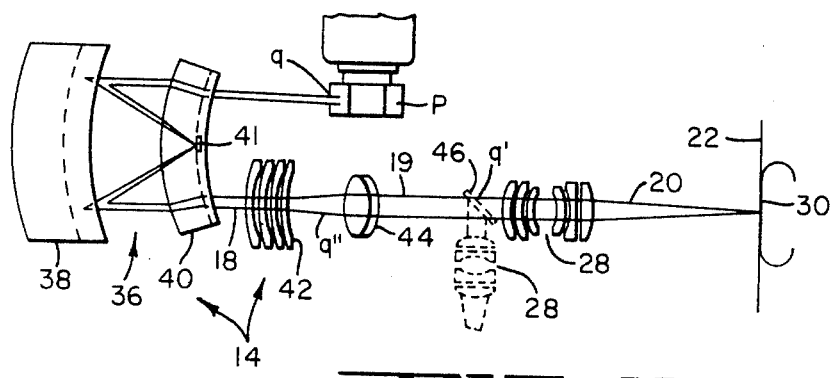
FIG_11

LIGHT BEAM SCANNING SYSTEM WITH SCAN ANGLE DEMAGNIFICATION

BACKGROUND OF THE INVENTION

1. Field

The invention relates to apparatus for mechanically scanning a focused light beam across a selected recording medium to provide data recording, readout, or display thereon, wherein the apparatus provides a scan angle demagnification, and advantageously also utilizes the demagnification means to convert from an angular scan to a flat field scan.

2. Prior Art

A basic problem in designing a light beam scanning system is that, on the one hand, it is desirable to have a small angular scan for a final scan beam, to facilitate the design of a (final) spot forming lens with low distortion, and provide the capability of working at the diffraction limit. On the other hand, it is desirable that the scanning mirror apparatus, i.e., the rotating mirror polygon, have as few faces as possible to facilitate fabrication of the polygon while maintaining accuracy of the mirror faces. It follows that it is desirable to have a large angle of scan in order to facilitate the fabrication of the polygon by requiring fewer faces, but it is equally desirable to have a small angle of scan in order to allow readily designing and fabricating a practical spot forming lens.

Accordingly, a compromise in the above conditions is required in order to optimize the design of the scanning system while minimizing the inherent disadvantages associated with the fabrication of either the rotating polygon or the spot forming lens. Thus apparatus which will reduce the angular scan between the polygon and the lens is a desirable feature. Reasonable polygon face numbers are 4, 6 or 8. It becomes increasingly difficult to fabricate polygons with more than 8 mirror faces. Reasonable scan angles for a low distortion spot forming lens to accept are of the order of 20° or less. However, a 6-face polygon normally provides 120° of scan with one entrant beam, and 60° of scan for two input beams, obviously an excessive scan angle for facilitating design of the spot forming lens. With an 8-face mirror polygon (which approaches a practical fabrication extreme), the angular scan with two input beams is 45°, which is still too large for facilitating the design of a high quality spot forming lens.

Further, prior art systems for generating a corrected flat field scan require the final optic elements to be disposed close to the focal plane. This in turn requires that the element is larger in diameter than the scan line length which is a prohibitive parameter when generating scan lines of 5 to 18 inches in length.

SUMMARY OF THE INVENTION

Accordingly, the invention provides scan angle demagnifier configurations capable of providing a reduced scan angle to facilitate fabrication of the spot forming lens of a light beam scanning system, while requiring a rotating polygon of few mirror faces (such as 8 or less). The demagnifier means of the invention combination provides inter alia specific arrangements of the rotating mirror polygon, the beam redirecting optics and the spot forming lens means of the system, to provide the effect of a desirable ratio of conjugates and thus, a corresponding reduction in the final beam scan angle. For example, the system includes a selected number and/or combination of positive and negative reflector and/or refractor lens elements in selected configurations. Further sophistication of the invention combination provides a positive refractor lens element (or elements) and a negative refractor lens element (or elements) in selected combination with the rotating mirror polygon and the beam redirecting optics, to generate in addition, a flat focal field scan.

In the basic embodiment, the rotating mirror polygon is located between the focal point and the center-of-curvature of a spherical reflector, or beyond the infinity focal point of a refracting optical means for redirecting the light beam. Thus the rotating mirror polygon and the spot forming lens means are located on an axis to permit conjugates of different lengths $C_1$ and $C_2$. It follows that at maximum scan angle the light beam reflected from the mirror face of the polygon will form an angle $\theta$ with respect to the optical axis of the system. This beam, upon redirection from a refractor lens of the refracting optical means, or the spherical reflector lens will cross the optical axis again at some point beyond the lens means, forming accordingly an angle $\phi$ with the optical axis, which angle $\phi$ is made smaller than the angle $\theta$ during the scan process, the reduction in angle being proportional to the ratio of the conjugates $C_1$, $C_2$. Thus is provided the scan angle demagnification effect in accordance with the invention.

The spherical reflector or refractor lens may be replaced by positive and negative reflector or refractor lens elements. To this end a specific embodiment provides an improved beam redirecting means, suitably situated between the rotating mirror polygon and the spot forming lens so as to provide a specific ratio of conjugates therebetween, to alter the scan field angle between input and output of the beam redirecting means. An additional advantage may accrue within the beam redirecting means, in that a specific type thereof introduces an inherent distortion which may be advantageously adjusted in the design to provide an accurate conversion to a flat field of scan in the final focal field.

Analysis of the scan linearity for the scan angle demagnifier of the invention provides a significant advantage over post scanning systems. The scanning spot displacement in the focal field may be made either linear with polygon rotation angle, or linear with the tangent of polygon rotation angle, to a very high degree of precision. Linearity with the tangent of polygon rotation angle is required for (and permits) a flat focal field, and thus a flat scan path. The flat focal field not only simplifies the problems of accurate positioning of a recording medium in the focal field, but simplifies displacement of the scan line in the focal field to enhance line tracking readout, while permitting the generation of a multiline raster for recordings or displays requiring a frame-type of data format. Another distinct advantage of the type of system described over prior art systems for generating a corrected flat field scan is related to the physical size of the optical elements closest to the focal plane. As previously mentioned, prior art systems with flat field scan require the final elements to be close to the focal plane, whereby the element must be larger in diameter than the length of the scan line, e.g., as much as 6 inch diameter for a 4 inch scan line. The design described hereby, however, permits a more conventional final lens of sufficient focal length so that its elements are all relatively smaller, and even smaller than the scan line length for long scan lines.

BRIEF DESCRIPTION OF THE DRAWINGS

FIG. 1 is a plan depicting a simplified optical schematic which illustrates a basic scan angle demagnification effect employing a refractive element, in accordance with the invention.

FIGS. 2 and 3 are a plan and elevation, respectively, depicting a simplified optical schematic which also illustrates the basic scan angle demagnification effect when employing reflective elements.

FIGS. 4 and 5 are a plan and elevation depicting an alternative reflective embodiment of apparatus employing the basic concepts depicted in the example of FIGS. 2-3.

FIGS. 6 and 7 are a plan and elevation depicting an alternative refractive embodiment of apparatus employing the basic concepts depicted in the example of FIG. 1.

FIGS. 8 and 9, 10 and 11 are plans and elevations respectively, of alternative embodiments further employing combinations of refractor and reflector lens elements to also provide a flat field scan.

DESCRIPTION OF THE PREFERRED EMBODIMENTS

Light scanning systems which utilize mechanical means for introducing a light beam scan in the form of a minute spot of light at or near the diffraction limit, have inherent difficulties at two opposing design extremes. First, the most practical rotating mirrors (polygonal or pyramidal types) are those utilizing few faces, e.g., 4, 6 or 8. However, the fewer the number of faces, the larger is the angular subtense of the scan field. On the other hand, diffraction limited (spot forming) lens designs are most practical where the angular field is small. Thus, to enhance the practical design of such systems, it is desirable to match the large angular scan at the rotating mirror polygon with a small angular scan at the spot forming lens of the system.

Referring to FIG. 1, the basic demagnification principle employed may be considered from the standpoint of a simple refractive lens $L_1$, with the rotatable mirror polygon P and spot forming lens $L_2$ situated at conjugates of different lengths $C_1$ and $C_2$. If conjugate $C_2$ is larger than $C_1$ then the angular subtense of the input field $A_1$ will be larger than the angular subtense of the output field $A_2$, whereby the scan angle into the lens $L_2$ will be reduced. A basic difficulty with such a simple refractive arrangement is that the positioning of the lens $L_1$ interfers with the positioning of the fixed entrant beam (or beams) which illuminates the rotating mirror polygon P to effect the scan.

Referring to FIGS. 2, 3 a further basic combination, which does circumvent the interference caused by the optics being in the way of the fixed entrant beam, lies in the use of an equivalent reflective system. The system of FIGS. 2, 3 provides a demagnification effect due to the positioning of the active mirror polygon surface between the focal point $f$ and the center-of-curvature $c$ of the spherical reflector $L_1$ to provide the conjugate ratio of previous mention. The plane of a fixed entrant beam 12 (or beams) is situated below the plane of the scan field and thus does not interfere with the latter, as shown in FIG. 3.

By way of further description of the basic optical system in accordance with the invention, the fixed entrant light beam 12 is introduced to the reflective system (see FIG. 3) and is directed to a beam directing means 14 herein defined by the spherical reflector means $L_1$. The entrant beam 12 is reflected therefrom to the rotating mirror polygon p, which is located on an optical axis 16 of the system, between the focal point $f$ and the center-of-curvature $c$ of the spherical reflector means $L_1$. The rotating mirror polygon P reflects a resulting initial scan beam 18 back to the face of the spherical reflector means $L_1$. At any one point in time, the initial scan beam 18 forms a scan angle $\theta$ with respect to the optical axis 16, which angle $\theta$ is shown near its maximum value in FIG. 2. A resulting scan beam 19, reflected from the spherical reflector means $L_1$, crosses the optical axis 16 at a point beyond the center-of-curvature $c$ forming a scan angle $\phi$ therewith. The ratio of the angles $\theta$ and $\phi$ is constant over all scan angles. A (final) spot forming lens means $L_2$ receives the resulting scan beam 19 at the crossover point on the optical axis 16, and provides optics for forming a final scan beam 20 and an associated, diffraction limited, low distortion, scan spot at a focal plane 22. Note that the scan angle of the final scan beam 20 is the same as the scan angle ($\phi$) of the resulting scan beam 19 introduced to the lens means $L_2$.

As in the example of FIG. 1, the conjugate $C_2$ is larger than conjugate $C_1$, whereby the angular subtense of the resulting scan beam 20 (herein represented by $2\phi$) will be proportionately smaller than the angular subtense of the initial scan beam 18 (herein represented by $2\theta$). Accordingly, since the (resulting) scan angle $\phi$ is always smaller than the (initial) scan angle $\theta$, the rotating mirror polygon P may employ relatively fewer faces, e.g., 4, 6 or 8, thereby facilitating its precise optical fabrication. Furthermore, although the use of fewer faces generally causes an undesirable attendant large scan angle, the invention combination employing the conjugate ratios described hereinabove provides the substantially smaller (final) scan angle $\phi$. By way of example, conjugate ratios of 2 to 6 are readily attained, thereby reducing $\phi$ from ½ to 1/6 of $\theta$. Thus a relatively smaller field angle requirement is imposed upon the spot forming lens means $L_2$, whereby the latter lens means is also more readily designed and fabricated.

Although operable, the basic system of FIGS. 2, 3 also has some disadvantages as a precision light beam scanning system. The collimated fixed entrant ray bundle corresponding to beam 12 does not remain precisely collimated or uniformly divergent after refraction from the spherical reflector means $L_1$. Furthermore, spherical aberration causes the resulting scan ray bundle corresponding to beam 19 to shift its cross-over point on the optical axis, i.e., at the spot forming lens means $L_2$, during the scan process. Accordingly, extensions of the basic system are employed to effect scan angle demagnification in accordance with the invention combination, with the capability of optimizing system precision.

For example, the above basic systems may be further extended to obtain a more practical effective ratio of conjugates by departing from the use of a single refractor or reflector element. Accordingly, FIGS. 4 and 5 depict such an alternate embodiment of the invention, employing beam directing means 14, formed of negative (convex) and positive (concave) spherical reflector surfaces or elements 24, 26 respectively (corresponding to previous lens $L_1$). As in the basic apparatus, the fixed entrant beam 12 impinges the rotating mirror polygon p, and then is reflected to the positive reflector element 26 of the beam directing means 14, as initial scan beam 18 forming an initial scan angle $\theta$. The beam 18 is then directed to the negative reflector element 24, and thence to a spot forming lens means 28 (corresponding to previous lens $L_2$) to define the final scan beam 20 having the final scan angle $\phi$ and an associated pivot point. A scan spot is formed along the focal plane 22, and also along a selected recording medium 30 which is transported in a direction transverse to the scan line direction in generally conventional arrangement. In the latter embodiment, the negative reflector element 24 may provide some compensation for the spherical aberration, deterioration of ray bundle collimation, etc., which is generated in the basic system of FIGS. 2-3. The scan angle demagnification effect is provided in the embodiment of FIGS. 4 and 5 by considering the combinated optical effect of reflective surfaces 24 and 26 to be equivalent in effect and location to the refractive lens element $L_1$ of FIG. 1. It follows that the conjugate $C_2$ is substantially larger than $C_1$, and thus the final scan angle $\phi$ is substantially smaller than angle $\theta$, in accordance with the invention.

FIGS. 6 and 7 depict a similar, alternative scanning system which obtains a useful effective ratio of conjugates and a flat field scan, utilizing a pair of refractor elements. To this end, a positive refractor element (or elements) 32 is disposed to receive the inital scan beam 18 from the rotating polygon p. The positive refractor element is combined with a negative refractor element (or elements) 34 to provide accordingly the final scan beam 20 of substantially reduced scan angle $\phi$ and associated pivot point. The beam 20 is focused to a diffraction limited spot which scans the recording medium 30, via the spot forming lens means 28. The same concept employed in the embodiment of FIGS. 6, 7 may be applied to refractive systems such as those equivalent to a Galilean telescope, which are also effectively used in accordance with the invention concepts for providing scan angle demagnification, as well as a flat field scan. The latter effect is achieved by utilizing the inherent nonlinear distortion of the refractor elements to advantage by making the scan spot position on the focal plane 22 substantially a linear function of the tangent of the field angle, as is further described infra.

However, the embodiment of FIGS. 6, 7, as in the embodiment of FIG. 1, experiences the basic difficulty in that the positioning of the fixed entrant beam (or beams) which illuminates the rotating mirror polygon P to effect the scan.

Accordingly, referring to FIGS. 8, 9, there is shown a preferred beam directing means 14 which allows positioning the rotating mirror polygon P to one side of the scan beam plane, thus allowing introduction of the fixed entrant beam 12 to the positive refractor element 32 with no interference from the latter element 32. To this end, catadioptic means 36 is added to the system as part of the beam directing means 14. The catadioptic means 36 includes a positive reflector element 38 and a corrective refractor element 40, which elements do not change the scan angles as do the reflective elements of the scan angle demagnifier apparatus in FIGS. 4 and 5. The catadioptic means 36 is of generally conventional design as shown in U.S. Pat. No. 3,520,586 assigned to the same assignee of this application. However, in this system, a reflecting surface 41 of the corrective refractor element 40 is disposed on the concave side thereof rather than on the convex side, to thus preclude deterioration of reflectivity due to minute pinholes, dust particles, etc., on the reflective surface 41. In the FIGS. 8, 9 embodiment, the positive refractor 32 does not interfere with the introduction of the fixed entrant beam 12. Thus the catadioptic means 36 provides optical apparatus for pre-imaging the pivot point q of the initial scan beam 18 to a pre-image point in space $q''$ along the optical axis 16 (FIG 9). The point in space $q''$ is equivalent to the corresponding position of the active mirror of the rotating mirror polygon P in the demagnifier system of FIGS. 6, 7. The remaining demagnifier apparatus 32, 34, 28 of FIGS. 8, 9 is essentially the same as that of FIGS. 6, 7, and provides the scan angle demagnification and flat field scan effects in accordance with the invention.

In the various embodiments shown herein, two (or more) fixed entrant beams 12, 12' (FIG. 8) may be utilized to impinge the rotating mirror polygon P. The beams 12, 12' are angularly spaced at substantially the extent of maximum angular scan. Such multiple entrant beam systems provide a pair of final scan beams 20, 20' and thus continuity of successive scan lines on the recording medium 30, where one beam is always active while the other is occluded by a polygon corner to provide minimum or zero deadtime between scans. The mirror polygon P provides a reflected scan beam angular displacement of twice the mirror face angle rotation. Note that a pyramidal mirror configuration may be used in place of the polygon to provide a one-to-one relationship between the mirror means rotation and the scan beam deflection. The above apparatus, and further modifications to the invention beam directing means, are disclosed in the above-mentioned U.S. patent.

FIGS. 10, 11 depict a further embodiment of the invention combination, which comprises a further sophistication of the apparatus shown in FIGS 6, 7 and 8, 9. As previously noted with reference to FIGS. 8, 9, the catadioptic means 36 provides for pre-imaging the pivot point $q$ of the initial scan beam 18 to a point $q''$ in space. Accordingly, since the pivot point $q''$ is disposed in space, additional rearranging of the optical components may be made to place the pivot point before or between the refractor elements 32, 34. This in turn allows additional modifications to be made to the arrangement and type of optical elements utilized, as is shown in the FIGS. 10, 11.

More particularly, the refractor elements 32, 34 can be reversed in order and placed much closer to the negative reflector element 40 of the catadioptic means 36. Thus a negative refractor element 42 is disposed to receive the initial scan beam 18. The beam is introduced thence to a positive refractor element 44, whereby the combination of elements 42, 44 provides the scan angle demagnification effect in accordance with the invention.

As may be seen, the optical combination of the beam directing means 14, which includes the demagnifier components 42, 44, provides a practical and compact system for scan angle demagnification in accordance with the invention. The ratio of conjugates $C_1$, $C_2$ is optimized to provide accordingly a substantially smaller scan angle $\phi$ for the resulting scan beam 19 introduced to the spot forming lens means 28. Reduction ratios between the initial and final scan angles $\theta$, $\phi$, respectively, may range on the order of from 2 to 6, whereby an initial scan beam entering the demagnifier such as that of FIGS. 10, 11 may scan through a useful angle of for example 45° to 60° while the resulting final scan beam may scan through an angle of 10° or less.

Various prior art scanning systems provide only for horizontal line scan motion, while the movement of the recording medium accomplishes the scan in the vertical direction. To provide vertical interlace with constant, rather than intermittent medium motion, requires that the line deflection in the vertical direction should occur simultaneously with movement of the medium. This, inter alia, requires that the scanning system be capable of providing the "flat field" scan of previous mention.

To this end, the scan angle demagnifier of FIGS. 10, 11 is a refracting type system and is made in the form of a Galilean telescope. This form of optics is employed in wide-angle attachments for photographic lenses, and also as the forward portion of inverted telephoto lenses. It is well known that barrel distortion occurs in extreme wide angle inverted telephoto lenses of the "fisheye" type. The invention combination contemplates the utilization of the barrel distortion to advantage, by making the scanning spot position on the focal plane 22 substantially a linear function of the tangent of the field angle, rather than being a linear function of the field angle. Thus the distortion is utilized in accordance with the invention, to produce a flat focal field, and thus a flat scan line across a flat recording medium 30. The flat focal field not only simplifies the problems of accurate positioning of the recording medium in the focal field, but also permits vertical displacement of the scan line in the focal field to enhance line tracking readout, while permitting the generation of a multi-line raster for recordings or displays requiring a frame type of data organization.

The barrel distortion arises in the negative components 42 of the lens system. An initial design of the negative lens was developed with the objective of obtaining a system in which the paraxial angular magnification is 6 to 1, and in which there is a linear relationship between the input angle and the tangent of the output angle. Although four concave lenses are shown for the negative elements 42 of FIGS. 10, 11, the design is practical with only three negative elements. Each element is designed to give nearly minimum spherical aberration of the principle ray. The ratio of the input angle to the tangent of the exit angle is substantially 6.0 in the paraxial region, and also at the extreme half angle. In such design there is a negligible departure from linearity at intermediate angles. In an actual design, the small departure reached a maximum value at 80% of the half angle and was of such a magnitude as to produce only 1/5 spot diameter shift within the focal plane of the final spot forming lens 28 over a scan line length of 2,000 spots. In an advanced design the analysis has shown that linearity may be improved even further to exceed the performance of even cartographic lens designs.

In the apparatus of FIGS. 10, 11 the negative elements 42 shift tend to the reimaged pivot point $q'$ of the scanning beam 19 appreciably to the right on the page, while the positive elements 44 in combination therewith actually place the pivot point $q'$ of the scanning beam at the entrance to the spot forming lens means 28, or even within the lens at its nodal center. The entrant and final scan beams 18, 20 are collimated, and the final scan beam 20 diameter is greater than that of the entrant beam diameter by the demagnifier ratio. In actual design, the demagnifier apparatus of FIGS. 10, 11 was made fully corrected to give diffraction limited performance through its entire range of scan angle.

The spot forming lens means 28 is of the distortionless type; the angular position of an incoming beam comes to focus at the same angular position in the focal plane. Examples of the means 28 are in the above-mentioned U.S. Pat. No. 3,520,586. The focal field of the lens is flat in both $x$ and $y$ directions with extremely low distortions. Thus, the resulting beam 19 to the lens means 28, scanning in relation to the tangent of the angular reflection from the rotating mirror polygon P, produces a flat focal field having a direct linear relationship to the input scan angle of the system. The spot forming lens means 28 is a quasi-symmetrical construction so as to minimize distortion, which causes a curvature of the scan lines as they move away from the center of the field.

By way of example only, a preliminary design of the apparatus of FIGS. 10, 11 included a demagnifier apparatus wherein the negative elements each have a thickness of 1.778 mm, a spacing of 3.302 mm, and an index of 1.720. The first element has a convex radius of 23.52 mm and a concave radius of 19.05 mm. The second element has a convex radius of 38.48 mm, and a concave radius of 44.45 mm. The final element has a convex radius of 50.80 mm and a concave radius of 23.62 mm. The positive component of the demagnifier is spaced 52.07 mm away and consists of two elements. The first surface facing the negative components of the demagnifier has a convex radius of 57.28 mm, a thickness of 4.191 mm, and inner convex radius of 101.6 mm, and an index of 1.521. The final element is spaced 1.27 millimeters away and has a concave radius of 84.66 mm, a thickness of 1.905 mm, a convex radius of 101.6 mm, and an index of 1.720. The pivot point is located 29.84 mm away from the last demagnifier element. The scan angle at the polygon P is 60°, the demagnification ratio is 4.6, the scan angle $\theta$ into the demagnifier apparatus is 50°, and the scan angle $\phi$ of the final scan beam is 10.85°.

In the embodiment of FIGS. 10, 11, formation of the reimaged pivot point $q'$ at the entrance to the spot forming lens means 28 allows the introduction, at that point, of a pivotable mirror 46 (depicted in phantom line) which in turn allows the formation of a raster by sequentially pivoting the mirror 46 through selected angular increments prior to tracing successive scan lines. Mirror 46 thus provides a raster scan on a stationary recording medium, and/or may provide the deflection device for a tracking system. Any of various tracking servo circuits (not shown) may be utilized in combination with the pivotable mirror 46 in a readout system, to generate a tracking error signal which is introduced to the mirror to correct for any deviation of the scanning spot from the desired scan line.

I claim:

1. An improved light beam scanning system capable of substantially diffraction limited performance, for scanning data in the form of lines on a medium during record, display and readout processes, and having at least one entrant light beam, comprising the combination of:

rotating mirror means formed of at least one mirror surface disposed to receive the entrant light beam and to generate an initial scan beam of a selected initial angular scan with a pivot point substantially at the mirror surface;

optical beam directing means disposed to receive the initial scan beam and to generate a final scan beam of substantially reduced angular scan relative to the initial angular scan; and spot forming lens means disposed to receive the beam of reduced angular scan and to form a focussed scan spot within a correspondingly reduced angular scan field.

2. The scanning system of claim 1 wherein the optical beam directing means reimages the pivot point substantially at the spot forming lens means.

3. The scanning system of claim 2 wherein the rotating mirror means and the spot forming lens means are situated at the extremes of conjugates of different lengths relative to the beam directing means, wherein the reduction in scan angle is proportional to the conjugate ratio.

4. The scanning system of claim 3 wherein the beam directing means includes, demagnifier means comprising refractor lens elements located between the initial and final scan beams to generate the final scan beam of reduced scan field angle, wherein the effective conjugates of the beam directing means determine the reimaged pibot point position at the spot forming lens means while determining the ratio of scan field angle reduction.

5. The scanning system of claim 4 including a flat medium wherein the refractor lens elements define a Galilean type telescope with inherent nonlinear distortion, said refractor lens elements disposed to provide the scan spot position on the flat medium as a substantially linear function of the tangent of the field angle.

6. The scanning system of claim 4 wherein the beam directing means further comprises, catadioptric means operatively disposed to receive the initial scan beam and to pre-image the pivot point thereof to a selected pre-image point spaced therefrom, said demagnifier means being disposed to receive the initial scan beam from the catadioptric means.

7. The scanning system of claim 6 wherein the preimaged pibot point is disposed within a range extending before, to within, the refractor lens elements of said demagnifier means, said refractor lens elements being further selectively spaced to direct the beam of reduced scan angle to the spot forming lens means.

8. The scanning system of claim 2 including a flat medium, wherein said optical beam directing means includes demagnifier means for reimaging the pivot point, said demagnifier means including nonlinear distortion which provides a scan spot position on the reduced angular scan field which is substantially a linear function of the tangent of the field angle and which thus traces a flat scan line across the flat medium.

9. The scanning system of claim 8 wherein the demagnifier means reimages the pivot point substantially at the spot forming lens means, and said beam directing means further includes catadioptric means disposed between the rotating mirror means and the demagnifier means for preimaging the pivot point to a pre-image point spaced therefrom prior to the demagnifier means.

10. The scanning system of claim 9 wherein the demagnifier means includes, a plurality of refractor elements having selected thicknesses, spacings, radii and indices of refraction.

11. The scanning system of claim 8 wherein the demagnifier means reimages the pivot point immediately prior to the spot forming lens means, and said beam directing means further includes pivotable mirror means disposed to intercept the beam of reduced scan angle at the reimaged point, to impart movement to the beam in a direction normal to the scan direction.

12. In a light beam scanning system having at least one entrant beam, a rotary polygon of multiple mirror surfaces for generating an initial beam scan of selected initial scan angle; a beam scan demagnifier means comprising optical lens elements having surfaces of substantially spherical curvature and disposed to generate a final scan beam of reduced scan angle; and spot forming lens means disposed to receive the beam of reduced scan angle to form a focussed scan spot within the correspondingly reduced angular scan field; said demagnifier means providing optical means for decreasing the number of mirror surfaces on the rotary polygon while simultaneously decreasing the beam scan angle to the spot forming lens to facilitate fabricating the latter.

13. The beam scan demagnifier means of claim 12 wherein said demagnifier means includes inherent nonlinear distortion, which in combination with the spot forming lens means provides the scan spot position on the reduced angular scan field which is substantially a linear function of the tangent of the field angle to thus trace a flat scan field.

* * * * *